United States Patent
Demers et al.

[11] Patent Number: 5,905,488
[45] Date of Patent: May 18, 1999

[54] LOCAL INKING WITH GRAY PIXELS

[75] Inventors: Alan J. Demers, Boulder Creek; Ronald A. Frederick, Mountain View; Christian P. Jacobi; Christopher A. Kantarjiev, both of Palo Alto; Robert T. Krivacic, San Jose; Mark D. Weiser, Palo Alto, all of Calif.

[73] Assignee: Xerox Corporation, Stamford, Conn.

[21] Appl. No.: 08/729,119

[22] Filed: Oct. 11, 1996

[51] Int. Cl.[6] ........................................... G09G 5/00
[52] U.S. Cl. ........................................ 345/173; 345/179
[58] Field of Search .................................. 345/173, 174, 345/179, 180, 181, 182, 183, 158; 178/18.01, 18.02, 18.1

[56] References Cited

U.S. PATENT DOCUMENTS

| | | | |
|---|---|---|---|
| 5,442,373 | 8/1995 | Nomura et al. | 345/104 |
| 5,633,659 | 5/1997 | Furuhashi et al. | 345/173 |
| 5,661,502 | 8/1997 | Cheng | 345/245 |

*Primary Examiner*—Richard A. Hjerpe
*Assistant Examiner*—Vanel Fresnel
*Attorney, Agent, or Firm*—Fay, Sharpe, Beall, Fagan, Minnich & McKee, LLP

[57] ABSTRACT

As an electronic pen (16) moves across a display screen (12), a position resolver (14) generates a series of x,y-coordinate positions which are sent to a remote computer system (20) having a relatively high latency or time delay before the positions are processed and intended display information is returned to the memory cells of a memory array (24) which controls the display on the display screen (12). During the time delay, a temporary display of the trajectory is created, preferably in light gray or another distinguishable color. Each x,y-coordinate position is compared (32) with an immediately preceding coordinate position to determine whether the pen has moved. If so, the new coordinate is stored in a memory (36) which stores a preselected number of the most recent coordinate positions and to a toggle circuit (38) which toggles a preselected bit of the display information stored in the corresponding memory cell of the memory array. After a preselected time, determined by clocking the recent coordinate position memory (36), the oldest stored coordinate position is clocked out and display information in the memory cell corresponding to the clocked out coordinate position is retrieved (42) and analyzed (44). If the toggled bit is still in the toggled position, the toggle circuit (38) toggles it back to the initial state. If the preselected bit has been reset by the intended drawing in the interim, it is not altered.

21 Claims, 2 Drawing Sheets

LOCAL INKING WITH GRAY PIXELS

BACKGROUND OF THE INVENTION

The present invention relates to the electronic drawing and display arts. It finds particular application in conjunction with tablet computers and will be described with particular reference thereto. However, it is to be appreciated that the present invention will also find application in other high latency drawing systems.

Heretofore, tablet computer systems have commonly included a drawing and display pad, such as a 640×480 grid of display cells. A memory array, for example 640×480×2, stored an indication whether each cell of the memory should be displayed as black or white.

The tablet computer systems further included an electronic writing pen and a pen sensitive surface overlying the display. The writing pen and sensitive surface, along with conventional resolver circuitry provided the x,y-coordinates of the writing pen relative to the coordinate system of the display grid. The x,y-coordinates of the pen were clocked out at regular, short intervals such that the output was a series of x,y-coordinates indicating the trajectory (or stationary position) of the pen.

The trajectory information was transferred by radio, cable, or other data link central computer. The central computer included the processing and drawing software for performing a number of drawing, recognition, or other operations based on the pen input. Typically, a relatively large number of tablet computers were networked with the central computer. After the central computer processed the trajectory information, it calculated appropriate displays to be displayed on the tablet computer screen. Often, but not always, the display included the immediate preceding trajectory of the electronic pen.

One of the drawbacks of the system resided in the latency or time lag between when the pen was moved and when time the central computer caused the local tablet computer to display the trajectory which the electronic pen had followed. Depending on system load, a lag or delay of 1–2 seconds was not uncommon. In 1–2 seconds, a user could write several words or even a complete communication either graphically or textually. Most users found it disconcerting to have no visual feedback as the pen moved. The trajectory was displayed a short time later, often in a sudden burst, i.e., the whole display or recent writings appeared at once.

The present invention provides a new and improved method and apparatus for providing the user with immediate feedback of the electronic pen's trajectory.

SUMMARY OF THE INVENTION

In accordance with one aspect of the present invention, a method of temporarily drawing a trajectory on an electronic display screen is provided. A series of coordinate positions indicative of points along the trajectory are generated. The trajectory is analyzed and an intended display is generated. The intended display is displayed on the display screen. However, there is a time lag between generation of the coordinate positions and the displaying of the intended display. During the time interval between the generation of the coordinate positions and the displaying of the intended display, a temporary display of the trajectory is generated. The temporary display is displayed in a manner which is differentiable by a user from the intended display.

In accordance with another aspect of the present invention, a computer system is provided. A display includes an array of display cells. A memory array has a memory element corresponding to each display cell for storing display information. A display controller causes the display cells to generate a display in accordance with the display information stored in corresponding memory elements of the memory array. A memory control changes the display information stored in the memory array in accordance with instructions from a graphics program. A resolver generates coordinate positions indicative of selected coordinates on the display. The resolver is clocked by a clock such that a series of coordinate positions are indicated. The resolver is connected with the graphics program. A recent coordinate memory is connected with the resolver for storing a preselected number of most recently generated coordinate positions. A toggle circuit is connected with the resolver to receive the coordinate positions. The toggle circuit toggles at least one bit of the display information stored in the memory element for the corresponding coordinate position in the display between a 0 and a 1. An array circuit is connected with the recent coordinate memory for receiving a least recent of the stored coordinate positions. The array circuit is connected with the toggle circuit for selectively causing the preselected bit of the display information for the corresponding coordinate to be toggled again.

One advantage of the present invention is that it provides immediate user feedback of the trajectory of the electronic pen.

Another advantage of the present invention is that the feedback is temporary. That is, it does not permanently overwrite or force a different display than the display generated by the central computer.

Another advantage of the present invention is that it provides the user with visual feedback to distinguish the temporary trajectory display from the final graphics display.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
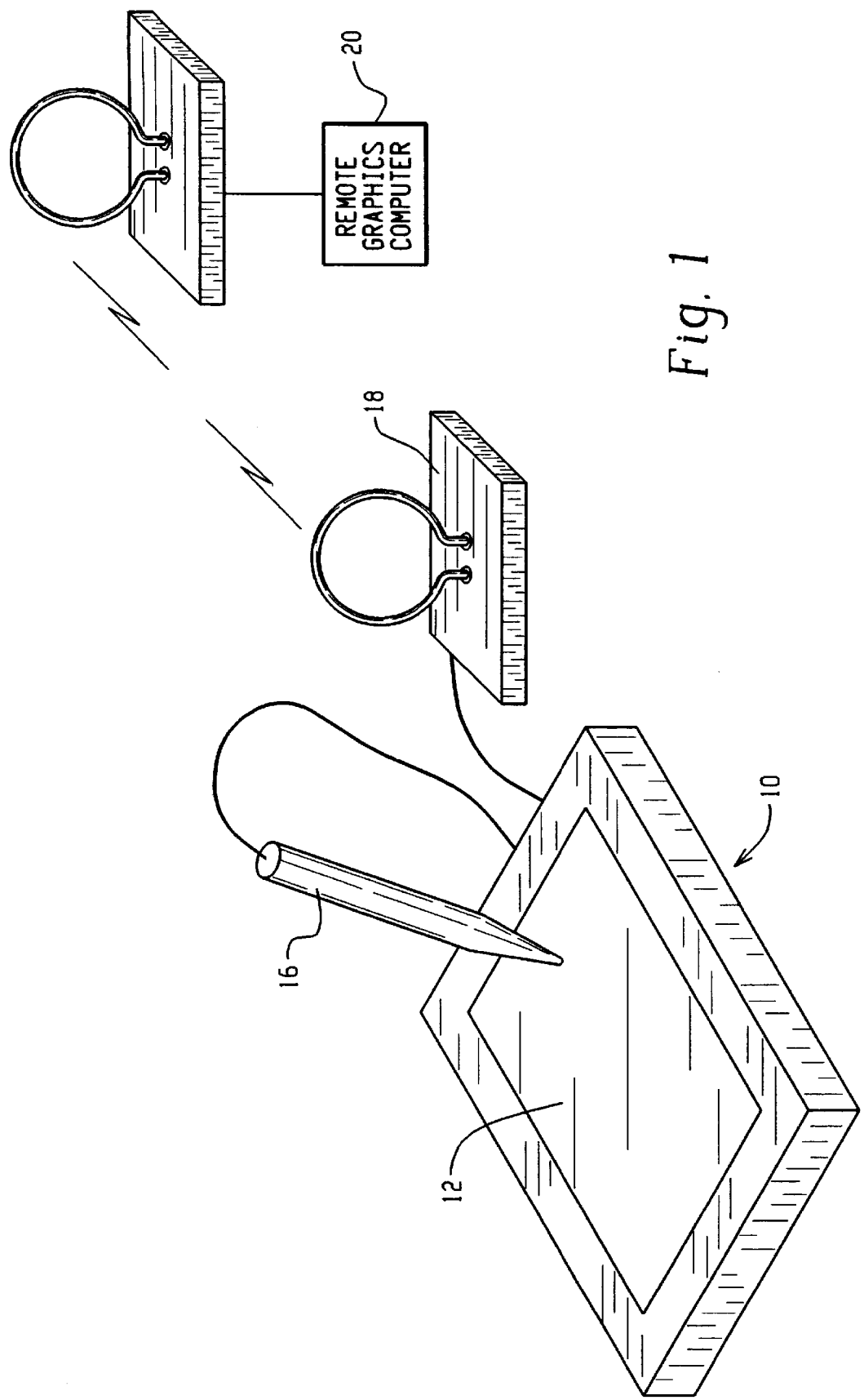
FIG. 1 is a diagrammatic illustration of a tablet computer system in accordance with the present invention; and, FIG. 2 is a diagrammatic illustration of the circuitry of the tablet pad of FIG. 1.

With primary reference to FIG. 1, a tablet computer system includes a tablet pad 10. A display and input surface 12 includes a grid of display cells or elements, such as a 640×480 element liquid crystal display. A light transmissive resistive layer overlays the light emitting elements. The resistive layer is connected by appropriate circuitry at its edges with an x,y-resolver 14, such that the resolver resolves an x,y-coordinate system of a pen 16 touching the surface. Preferably, the pen includes a pressure sensitive switch connected with its tip to enable the resolver when the pen is in firm contact with the surface and disable the resolver when the pen is displaced from the surface. More specifically, the x,y-resolver 14 analyzes the analog output and generates digital x and y-coordinate signals which are communicated to a transmitter/receiver 18. The transmitter 18 transmits the coordinate information to a central computer system 20.

Figure 2:
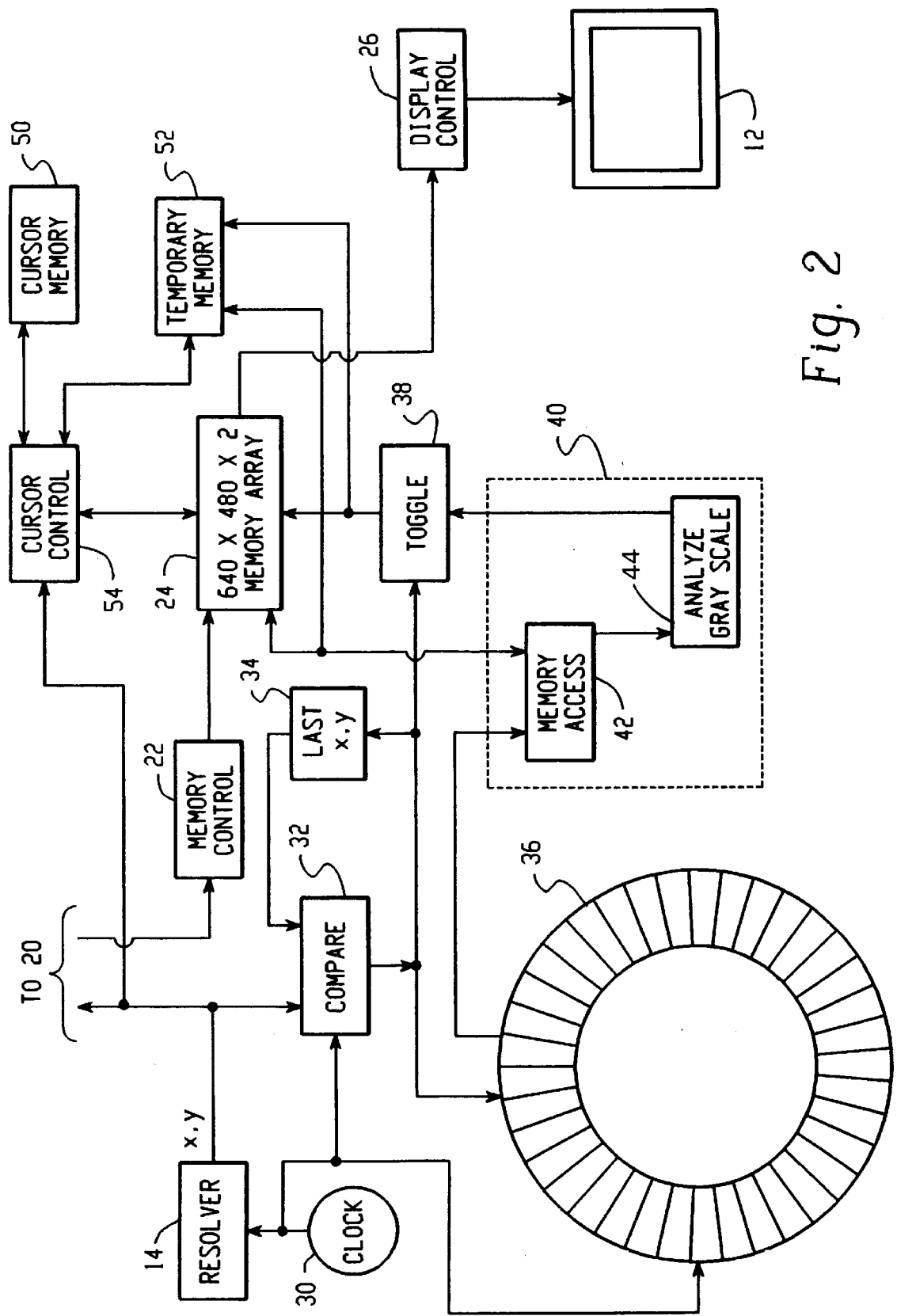

With particular reference to FIG. 2, the central computer system 20 processes the coordinate information in any of a multiplicity of ways as are known in the art. After processing, the central computer system transmits display instructions to the transmitter/receiver 18 for controlling the display 12. More specifically, the received information is carried to a memory control 22 which updates a memory array 24, such as a 640×480×2 memory. Each of the 2-bit memory cells of the memory grid is connected with a corresponding liquid crystal element of the display 12 by a LCD control circuit 26. The light emitting diodes are turned ON or OFF in accordance with the instructions from the central drawing computer and the state of the memory cells in the memory array 24.

Although described with reference to a black and white display, it is to be appreciated that color displays are also contemplated. For example, when using a color display, the memory 24 can be a 640×480×16 memory array, 5 of the bits reserved for red, 5 of the bits reserved for blue, and 5 of the bits reserved for green. Use of the 16-th bit is explained below. Of course, larger (or smaller) memories can be used for better resolution and greater color selection freedom.

Returning to the black and white embodiment for simplicity of illustration, each time a clock 30 clocks the current x,y-coordinates from the resolver 14, the x,y-coordinates are communicated not only to the transmitter 18, but are also conveyed to a circuit which determines whether the pen 16 is moving or stationary. A comparator 32 retrieves the most recently stored bits in a last coordinate memory 34. The comparator compares the current x,y-coordinate position with the last x,y-coordinate system from the last coordinate memory 34. If they are different, the newest x,y-coordinate position is loaded into the memory 34. If the current x,y-coordinates are the same as the last x,y-coordinates, then a dummy value is output which indicates that there has been no change in the x,y-coordinates or trajectory since the last clock cycle. A first-in/first-out memory 36 works as a loop memory. That is, in the preferred embodiment, it has 100, for example, memory locations which each store the newest x,y-coordinate pair or the dummy value. Each time the clock 30 clocks the resolver 14, it also clocks the loop memory 36 to the next memory location and clocks the last x,y-coordinate position memory 34.

When the comparator finds that the current x,y-coordinate is different from the last one, it sends the new coordinate to a toggle circuit 38. In the illustrated black and white embodiment, each light emitting element is controlled by a 2-bit signal. Because the central computer only works in black and white, all of the signals stored in the 640×480×2 memory are either 1 1 or 0 0 to indicate black or white, or ON or OFF in the case of a monochrome display of other than black and white. The toggle circuit 38 toggles the most significant bit, in the preferred embodiment, to its opposite state, i.e., from 1 to 0 or from 0 to 1. A display of 1 1 becomes 0 1 and a display of 0 0 becomes 1 0. In this manner, a display element which is OFF is changed to become ⅔ ON and a display element that is ON is signaled to become ⅓ ON (⅔ OFF). When the central computer signals the drawing system to update the 640×480×2 memory, it overwrites the toggled bits, changing the memory cells to 1 1 or 0 0 as is appropriate to the output display instructions.

As indicated above, the central computer does not always output drawing instructions that overwrite or draw in the most recently followed trajectory. Accordingly, it is advantageous to delete the temporary trajectory after a short term such that the temporary trajectories do not accumulate on the screen. To this end, a temporary trajectory erase circuit 40 is connected to the loop memory 36. Each time a coordinate location in the loop memory 36 is indexed to the last position where it is next to be overwritten, it is read out to the temporary trajectory erasing system 40. The temporary trajectory erasing system 40 includes a circuit 42 for accessing the display memory 24 and retrieving the stored 2-bit value corresponding to the coordinate to be erased. A bit analyzing circuit 44 determines whether the retrieved gray scale value is 1 1 or 0 0, e.g., if the bit was written in by the central computer system or whether the retrieved gray scale value is 0 1 or 1 0, indicative of a temporary trajectory. If the stored value is 1 1 or 0 0, the analysis circuit 44 does nothing. If the gray scale value indicates a 1 0 or 0 1 gray scale level, the analysis circuit enables the bit toggling circuit 38 to toggle the most significant bit to its other state. In this manner, the gray scale value is restored to its original 1 1 or 0 0.

If a cursor is displayed centered on the current coordinate where an electronic pen 16 is touching the display 12, then a cursor display system is included. The cursor display system includes a cursor memory 50, such as a 32×32 bit memory. The memory bits are designated as black, white, or transparent, as is appropriate for the selected cursor configuration. A temporary memory 52 of the same size, e.g., a 32×32 bit memory, is connected with the 640×480×2 display memory 24. The current x,y-coordinates from the resolver are conveyed to a cursor position control 54 which causes the data in the 32×32 bit region around the center of the cursor to be moved to the temporary memory 52 and the bits from the cursor memory 50 to overwrite the bits in the display memory 24. As the cursor moves, the cursor control 54 shuffles the bits between the 32×32 temporary memory 52 and the display memory 24. In this manner, the portion of the display memory directly under the cursor is temporarily overwritten by the cursor pattern from the cursor position memory So and the original data values are restored from the temporary memory 52 after the cursor moves. The temporary memory 52 serves effectively as a part of the display memory for purposes of the central computer drawing instructions and the temporary trajectory. That is, the memory control 22, the toggle circuit 38, and the analysis circuit 44, are all connected with the temporary memory 52 to adjust its pixel values in the same manner that the corresponding pixel values within the image memory 24 are adjusted (or sought to be adjusted if overwritten by the cursor pattern).

In the color embodiment in which the display memory 24 is 16-bits deep and 5 bits are reserved for each color, the unused 16-th bit is toggled. The display circuit 26 which converts the values stored in the display memory 24 into appropriate intensities in the display 12 senses the state of this otherwise unused 16-th bit and adjusts the display. For example, when it is 0, there is no effect on the display. When the bit is toggled to 1, the display control circuit can reduce the intensity of all three color components by 50% or some other preselected amount. Alternately, a 1 in the 16-th bit can cause the display control 26 to index the colors, e.g., red to green, green to blue, and blue to red. Other schemes in which an unused or redundantly used bit is available in the display memory to cause the display controller 26 to adjust the display are also contemplated.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A computer system comprising:

a display including an array of display cells;

a memory array having a memory element for storing display information corresponding to each display cell;

a display controller for causing the display cells to generate a display in accordance with the display information stored in corresponding memory elements of the memory array;

a memory control for changing the display information stored in the memory array in accordance with instructions from a graphics program;

a resolver for generating coordinate positions indicative of selected coordinates on the display, the resolver being clocked by a clock such that a series of coordinate positions are indicated, the resolver being connected with the graphics program;

a recent coordinate memory connected with the resolver for storing a preselected number of most recently generated coordinate positions;

a toggle circuit connected to receive coordinate positions from the resolver, the toggle circuit toggling at least one preselected bit of the display information stored in the memory element for the corresponding coordinate position in the display between a 0 and a 1;

an erase circuit connected with the recent coordinate memory for receiving a least recent of the stored coordinate positions, the erase circuit being connected with the toggle circuit for selectively causing the preselected bit of the display information for the corresponding coordinate to be toggled again.

2. The system as set forth in claim 1 further including:

a comparator connected between the resolver and the recent coordinate memory and a temporary memory for storing an immediately preceding coordinate position output by the resolver, the comparator comparing a current coordinate position from the resolver with the immediately preceding coordinate position from the temporary memory to determine whether the coordinate has changed, the comparator causing each changed coordinate position to be stored in the recent coordinate memory and causing an indication that the coordinate has not changed to be stored in response to the coordinate position not having changed.

3. The system as set forth in claim 1 further including:

a circuit for determining whether the coordinate position from the resolver has changed from a preceding clock cycle, the circuit causing changed coordinates to be sent to the recent coordinate memory and the toggle circuit, whereby the bits are toggled only in response to a change in coordinate position.

4. The system as set forth in claim 3 wherein the erase circuit includes:

a memory access circuit for accessing the memory cell of the memory array corresponding to each received coordinate position and retrieving the stored display information;

an analysis circuit for analyzing the retrieved display information to determine whether the preselected bit has been toggled and in response to determining that the preselected bit has been toggled, causing the toggle circuit to retoggle the preselected bit.

5. The system as set forth in claim 1 wherein the erase circuit includes:

a memory access circuit for accessing the memory cell of the memory array corresponding to the received coordinate position to retrieve the display information stored therein;

an analysis circuit for analyzing the retrieved display information to determine whether it has been altered by the toggle circuit in response to determining that the retrieved display information was altered, the analysis circuit causes the toggle circuit to restore the altered display information.

6. The system as set forth in claim 1 wherein the resolver is connected with an electronic pen such that the resolver generates coordinate positions indicative of a trajectory of the pen across the display.

7. The system as set forth in claim 1 wherein the graphics program is resident in a remote computer such that significant time delays are incurred between coordinate positions being generated by the resolver and display instructions being received by the memory control.

8. The system as set forth in claim 7 further including a radio link between the resolver and the remote computer and between the remote computer and the memory control.

9. The system as set forth in claim 1 wherein the memory elements of the memory array include a first bit and second bit, 1's in both bits and 0's in both bits being indicative of an ON and OFF state of a monochrome display.

10. The system as set forth in claim 9 wherein the toggle circuit toggles a preselected one of the first and second bits such that one of the bits is 0 and the other is 1, the display controller displaying 1 1 and 0 0 as black and white and displaying 0 1 and 1 0 as intermediate shades of gray.

11. The system as set forth in claim 1 wherein the display is a color display and wherein the memory elements of the memory array each have a plurality of bits for each of a plurality of colors and at least one unused bit, the toggle circuit toggling the unused bit.

12. A method of temporarily drawing a trajectory on an electronic display screen, the method comprising:

generating a series of coordinate positions indicative of points along the trajectory;

sending the trajectory to a remote processing system for generating instructions for an intended display;

sending the intended display instructions to the electronic display screen, there being a time lag between generation of the coordinate positions and the sending of the display instructions to the electronic display screen;

during the time lag between generation of the coordinate positions and the sending of the intended display instructions, at the electronic display screen locally generating a temporary display of the trajectory, the temporary display being displayed in a manner which is differentiable by a user from the intended display;

after receiving the display instructions at the electronic display screen, replacing the temporary display with the intended display of the trajectory.

13. A method of temporarily drawing a trajectory on an electronic display screen, the method comprising:

generating a series of coordinate positions indicative of points along the trajectory;

analyzing the trajectory and generating a temporary display which is displayed in a manner which is differentiable by a user from permanent displays, generating the temporary trajectory display including:
  storing a plurality of recently generated coordinate positions along the trajectory;
  altering at least one preselected bit of a corresponding memory element of a memory array which stores digital display information which controls the display screen;
after a time lag as the coordinate positions are analyzed and a permanent display is created, deleting the temporary trajectory display and replacing the temporary trajectory display with a final display of the trajectory.

14. A method of temporarily drawing a trajectory on an electronic display screen, the method comprising:
  generating a series of coordinate positions indicative of points along the trajectory;
  during a time lag after generation of the coordinate positions while the coordinate positions are analyzed to generate a permanent display of the trajectory, generating a temporary display of the trajectory, the temporary display being displayed in a manner which is differentiable by a user from the permanent display, generating the temporary trajectory display including:
    storing a plurality of recently generated coordinate positions along the trajectory;
    altering at least one preselected bit of a corresponding memory element of a memory array which stores digital display information which controls the display screen;
  as the permanent display is generated, erasing the temporary trajectory including:
    retrieving a least recently stored one of the plurality of coordinate positions;
    retrieving the digital display information from the corresponding memory element of the memory array;
    analyzing the retrieved digital display information to determine whether the preselected bit has been altered; and,
    in response to determining that the preselected bit has been altered, returning the preselected bit to its original condition.

15. The method as set forth in claim 14 wherein the preselected bit is toggled between a 1 and a 0.

16. The method as set forth in claim 14 wherein the preselected bit is one of (i) unused to store the display information and (ii) used to store display information which is redundant with another bit.

17. The method as set forth in claim 14 further including:
  comparing each coordinate position with an immediately preceding coordinate position, in response to determining that the coordinate position has changed, storing the current coordinate position and toggling the preselected bit in the memory cell corresponding to the current coordinate position.

18. The method as set forth in claim 14 wherein the intended display is only a monochrome display and each memory cell of the memory array has 2 bits, which 2 bits are loaded either both with 1's or both with 0's when displaying the intended display and wherein the altering step changes one of the bits between a 0 and a 1, whereby the temporary trajectory is displayed in gray scale.

19. The method as set forth in claim 14 wherein the memory cells of the memory array store a plurality of bits for each of three colors and have at least one unused bit, and wherein the altering step toggles the unused bit between a 1 and a 0.

20. A method of drawing trajectories on an electronic display screen, the method comprising:
  moving an electronic pen across the display screen;
  generating coordinate positions indicative of the trajectory of the electronic pen across the display screen;
  immediately generating a temporary display of the trajectory on the display screen;
  processing the generated coordinate positions to generate a final display of the trajectory;
  replacing the temporary display of the trajectory on the display screen with the final display.

21. A system for temporarily drawing a trajectory on an electronic display screen, the system comprising:
  a means for generating a series of coordinates indicative of points along the trajectory;
  a means for generating a temporary display of the trajectory on the electronic display screen during a time interval in which an intended display is generated;
  a means for processing generated coordinates and generating an intended display there being a delay by a time interval between generation of the coordinates and the generation of the intended display; and,
  a means for replacing the temporary display of the trajectory with the intended display after the time interval in which the coordinates are processed and the intended display is generated.

* * * * *